United States Patent Office 3,442,973
Patented May 6, 1969

3,442,973
ISOMERIZATION PROCESS UTILIZING A GOLD-PALLADIUM ALLOY IN THE CATALYST
John H. Sinfelt, Berkeley Heights, Allan E. Barnett, Westfield, and George W. Dembinski, West Orange, N.J., assignors to Esso Research and Engineering Company, a corporation of Delaware
No Drawing. Filed Nov. 14, 1966, Ser. No. 593,710
Int. Cl. C07c 5/24
U.S. Cl. 260—683.65     3 Claims

ABSTRACT OF THE DISCLOSURE

An isomerization process for isomerizing normal paraffins in the $C_4$–$C_8$ range is conducted with a catalyst comprising an alloy of gold and palladium on an alumina support. The amount of gold is 0.10–2.0 wt. percent based on the total catalyst; the amount of palladium corresponds to 5–83 wt. percent the gold present in the alloy.

---

This invention relates to an improved isomerization catalyst. More particularly, this invention relates to an isomerization catalyst in which selectivity is greatly enhanced while cracking and other undesirable side reactions are minimized. This is accomplished by contacting the hydrocarbon to be isomerized with a combination of Group I–B and Group VIII metals in critical proportions.

A variety of reasons exists for isomerizing the hydrocarbons. It is desirable to isomerize certain aromatic compounds such as meta-xylene to para-xylene, in order to produce a product which is used in the manufacture of polyester fibers. The isomerization of other aromatics, e.g., pseudo cumene to mesitylene, is also of interest.

The isomerization of aliphatic hydrocarbons is a particularly important area; perhaps the most widely used isomerization techniques are those relating to light paraffins, i.e. boiling within the naphtha range. Isomerized light paraffins such as isopentane, isoheptane and isooctane have considerably higher octane ratings than the corresponding normal paraffins. This is of course also true of olefinic hydrocarbons. The recovery of maximum isomerized hydrocarbons is, of course, the main goal of such an isomerization process. Unfortunately, in the past, many of the active isomerization catalysts also show a very strong tendency toward encouraging hydrocracking. This cracking in turn served to produce lighter weight hydrocarbons and minimize the conversion to the desired product. Thus, the yield of $C_4$–$C_8$ isoparaffins was minimized and at the same time, maximum amounts of light products were formed. This has continued to be a severe problem in the industry.

In a recent U.S. Patent, U.S. 2,911,357, Myers et al., an alloy was disclosed which combined metals of Groups I–B, VII–A and VIII of the periodic system. The purpose of the invention was to provide a method of stabilizing platinum-type catalyst so as to increase the life of these catalysts in hydrocarbon conversion processes which operate at elevated temperatures. Patentees discovered that platinum which was originally present in a highly dispersed amorphous form has a tendency to grow into metallic crystals which have a larger size and much lower surface area. In order to prevent this, patentees incorporate a Group I–B or Group VIII metal into the catalyst and this in turn leads to increased stability. The catalyst comprises 0.01 to 4 wt. percent of a Group VIII metal and a Group I–B metal in the amount of 1 to 100 wt. percent of the Group VIII metal present in the catalyst. By way of an incidental disclosure, patentee indicates that one of the areas which may profit from this increased stability is isomerization. However, patentee is interested only in maintaining the activity of a platinum catalyst; he is not concerned with a method for improving reactivity, nor is he dealing with catalysts which contain a major proportion of gold.

According to this invention, it has unexpectedly been found that a combination of a Group I–B metal and a Group VIII metal, on an acidic support, gives higher selectively for isomerization of hydrocarbons and particularly normal paraffins to their branched configurations than does either of the pure metals on an acidic support. More particularly, it has unexpectedly been discovered that if a major amount of a Group I–B metal and a minor amount of a Group VIII metal are combined on an acidic support, so that an alloy may be formed, the selectivity is maximized. Specifically, the weight ratio of I–B metal to Group VIII metal should be about 1.2 to 20, preferably 1.5 to 6 and more preferably 1.5 to 2.0. Using this particular ratio maximizes the selectivity of conversion of n-heptane, for example, to 2-methyl hexane, 3-methyl hexane, and the dimethylpentanes. In the case of a gold-palladium combination on alumina, catalysts with a gold to palladium weight ratio of 1.5 to 2.0 exhibit significantly higher selectivity of conversion of normal paraffins such as n-heptane to these isomers than catalysts with a gold to palladium ratio of 1.0 or lower. The higher selectivity to isoparaffins is obtained primarily as a result of lower hydrocracking activity. Since the major metal component is gold, the catalyst can be considered as a gold catalyst promoted by palladium.

The catalyst itself comprises a combination of a Group I–B metal such as gold, silver or copper and a Group VIII metal such as platinum, palladium or nickel. The metal combination may be an alloy, and is dispersed on a solid support. Preferably, the solid support is acidic in nature, e.g., alumina. The percentage of support in the catalyst is approximately 80.0 to 99.9%, preferably 98.0 to 99.9% and most preferably 98.2 to 99.75%. Metal from Group I–B may comprise 0.1 to 10.0 wt. percent of the catalyst, preferably 0.1 to 2.0 wt. percent and most preferably 0.15 to 1.2 wt. percent. The relative proportions of Group I–B metal and Group VIII metal in the combination are critical. The combination must contain a major proportion of Group IB metal and a minor proportion of Group VIII metal. More specifically, the Group VIII metal is present in the amount of 5 to 83 by wt. percent of the Group I–B metal, preferably 16 to 67% of the Group I–B metal and most preferably 50 to 67% of the Group I–B metal. Maximum isomerization selectivity is not obtained unless the combination contains more Group I–B metal than Group VIII metal. The most important element in maximizing isomerization selectivity seems to be the corresponding minimization of hydrocracking activity although there is no intention to be bound by any particular mechanism.

The method of impregnation is conventional. The following technique for the gold-palladium on alumina catalyst is typical: An aqueous solution of $PdCl_2$ and $AuCl_3 \cdot HCl \cdot 3H_2O$ in the proper proportions is prepared. To aid in the solution of the salts, some concentrated HCl is added. The alumina support is then wetted with the impregnating solution, and the resulting material is dried at 105° C. The catalyst can then be pelleted or extruded.

The preferred embodiment of the instant invention concerns the use of a gold-palladium alloy supported on alumina as an isomerization catalyst.

Feedstreams to this process include any stream containing a substantial proportion of $C_4$–$C_8$ normal paraffins, including the individual pure n-paraffins, paraffinic virgin naphthas, or concentrated n-paraffin fractions.

It is also within the scope of this invention to saturate normal olefinic feedstocks and isomerize aromatics in the $C_8$ to $C_{10}$ range.

The table below indicates the results which were achieved.

TABLE

[Conversion of n-heptane over Pd-Au-Al$_2$O$_3$ catalysts] [1]

| Catalyst | Percent conversion | Percent Selectivity to | | | |
|---|---|---|---|---|---|
| | | $C_1$-$C_2$ | $C_3$-$C_6$ | Toluene | Iso $C_7$ |
| 1 ..... 0.6% Pd | 45.5 | 2.9 | 37.9 | 7.6 | 50.0 |
| 2 ..... 0.6% Pd+0.1% Au | 46.5 | 2.2 | 20.0 | 9.0 | 66.9 |
| 3 ..... 0.6% Pd+0.6% Au | 34.7 | 1.6 | 10.9 | 5.7 | 78.7 |
| 4 ..... 0.6% Pd+1.2% Au | 50.3 | 1.6 | 11.0 | 4.9 | 81.3 |
| 5 ..... 0.6% Au | 10.5 | 15.0 | 60.5 | <0.1 | 24.5 |

[1] Conditions: 850° F., 200 p.s.i.g., $H_2/nC_7$=5/1, W/hr./W=20, product analyses after 15 min. on stream.

With respect to operating conditions for the isomerization reaction, temperatures should be maintained between 600 and 950° F., preferably 700 and 850° F. Pressures of 1 atm. to 50 atm., preferably 10 atm. to 30 atm. may be employed. The feedstream should be introduced at a liquid hourly space velocity of about 0.5 to 50 grams per hour per gram of catalyst. In this manner conversions to isomers approaching the equilibrium values can be obtained. Hydrogen recycle may be 500 to 10,000 s.c.f. per barrel of feed, preferably 2,000 to 5,000 s.c.f. per barrel of feed. The feedstream is introduced in the liquid phase and is vaporized prior to entering the reactor.

In a particular preferred embodiment of this invention a feedstream which is n-heptane is introduced into an isomerization zone containing a palladium-gold alloy supported on alumina. The gold is present in the amount of 0.15 to 1.2 wt. percent, palladium is present in a range of 50 to 67 weight percent of the gold, with the remainder of the catalyst being alumina. Temperature over the isomerization zone is maintained at 700 to 850° F. and pressure is 10 to 20 atm. The feedstream is maintained substantially in the vapor phase and passed over the catalyst at a rate of 20 grams per hour per gram of catalyst. At the end of 10 to 20 minutes, the product stream was analyzed by means of gas chromatography. The original stream was n-heptane (99 mole percent minimum). After contact with the catalyst composition of the instant invention, the following conversion of n-heptane was obtained:

| Conversion to: | Wt. percent |
|---|---|
| 2-methyl hexane | 15.7–18.6 |
| 3-methyl hexane | 18.0–20.1 |
| 2,2+2,4 dimethylpentanes | 1.9–2.3 |
| Benzene+toluene | 1.9–3.0 |
| $C_1$-$C_2$ | 0.9–0.8 |
| $C_3$-$C_6$ | 5.8–5.5 |

EXAMPLE 1

In this example a comparison was made between the supported catalyst containing varying amounts of a Group VIII metal, a palladium, and a Group I-B metal, gold. All of the catalysts which were tested were supported on an eta alumina support with a surface area of 295 m.$^2$/gm. They were prepared by impregnating 10 grams of alumina with 6.5 cc. of an aqueous solution of $PdCl_2$ and $AuCl_3 \cdot HCl \cdot 3H_2O$ in the proper amounts to give the Pd-Au composition indicated. The solution contained 1.4 grams of HCl which was added to improve the solubility of the palladium salt.

Table I indicates that a pure gold or pure palladium catalyst achieved the worst results with respect to isomerization. Sharply improved results were achieved with catalyst number 4 which contained twice as much gold as palladium.

The iso $C_7$ paraffins consist of 2-methyl hexane, 3-methyl hexane, and 2,2 and 2,4-dimethylpentanes. In the case of the catalyst with the gold to palladium ratio of 2.0, the selectivity of conversion of the n-heptane to the $C_7$ isoparaffins was higher than that obtained with the catalyst in which the ratio was 1.0. The advantage for the higher gold to palladium ratio becomes all the more evident when it is noted that the conversion level was also substantially higher.

EXAMPLE 2

In this example the same conditions as in Example 1 were utilized. The catalyst comprised 0.15 wt. percent gold and 0.10 wt. percent palladium. The selectivity to iso $C_7$ was 80.5% and the percent conversion was 44.3.

Although this invention has been described with some degree of particularity, it is intended only to be limited by the attached claims.

What is claimed is:

1. An improved process for isomerizing normal paraffins in the $C_4$ to $C_8$ range which comprises passing said normal paraffins into an isomerization zone, said zone containing a catalyst comprising an alloy containing about 0.10 to 2.0 wt. percent of gold based on said catalyst and and amount of palladium corresponding to about 5 to 83 wt. percent of the gold present, impregnated on an alumina support, maintaining said zone at a temperature of 600° to 950° F. and a pressure of 0 to 750 p.s.i.g. and withdrawing a substantially isomerized product.

2. The process of claim 1 wherein said paraffins are introduced at a rate of 0.5 to 50 grams per hour per gram of catalyst.

3. The process of claim 2 in which a hydrogen recycle at a rate of 500 to 10,000 standard cubic feet per barrel is utilized.

References Cited

UNITED STATES PATENTS 3,114,695 12/1963 Rabo et al. _____ 260—683.65
3,182,097 5/1965 Brennan et al. _____ 260—683.2

DELBERT E. GANTZ, *Primary Examiner.*

G. J. CRASANAKIS, *Assistant Examiner.*

U.S. Cl. X.R.

252—474